Jan. 26, 1971   G. W. JACKSON   3,558,154
COMBINATION VALVE AND ELECTRIC SWITCH ASSEMBLY FOR
AUTOMATIC VEHICLE LEVELING SYSTEM
Filed May 1, 1969   2 Sheets-Sheet 1

INVENTOR.
George W. Jackson
BY
J. C. Evans
ATTORNEY

Jan. 26, 1971   G. W. JACKSON   3,558,154
COMBINATION VALVE AND ELECTRIC SWITCH ASSEMBLY FOR
AUTOMATIC VEHICLE LEVELING SYSTEM
Filed May 1, 1969   2 Sheets-Sheet 2

INVENTOR.
George W. Jackson
BY
J. C. Evans
ATTORNEY 3,558,154
COMBINATION VALVE AND ELECTRIC SWITCH ASSEMBLY FOR AUTOMATIC VEHICLE LEVELING SYSTEM
George W. Jackson, Dayton, Ohio, assignor to General Motors Corporation, Detroit, Mich., a corporation of Delaware
Filed May 1, 1969, Ser. No. 820,724
Int. Cl. B60g 11/56
U.S. Cl. 280—124                                                5 Claims

ABSTRACT OF THE DISCLOSURE

In preferred form, a combination valve and electric switch assembly on an air tank enclosing a compressor. The interior of the tank is connected to an outlet in the assembly. The assembly includes a normally closed check valve that is connected by the assembly to the compressor inlet. A pressure responsive switch in communication with the check valve completes an energization circuit for an electric compressor drive motor when the inlet is supercharged and opens the check valve so the compressor will charge the tank. The switch includes an overtravel mechanism and spring detent arrangement for producing snap opening and closure of the electrical switch of the assembly in response to changes in sensed pressure.

---

Figure 1:
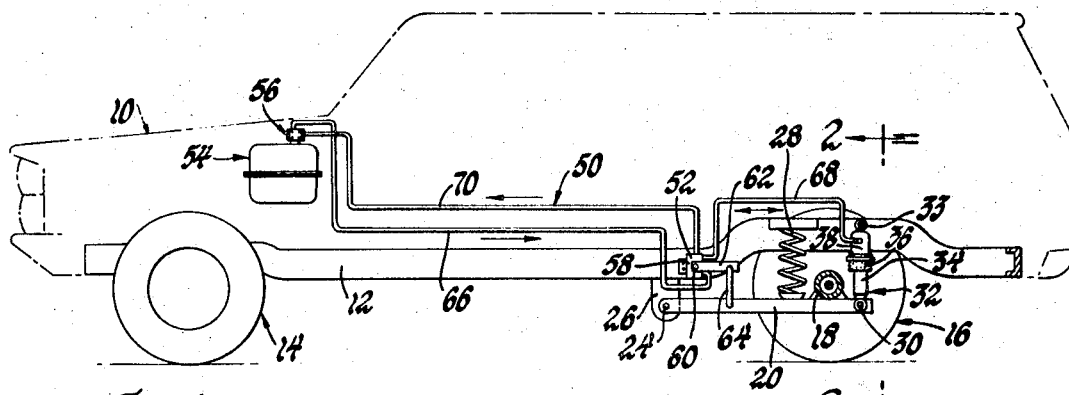

This invention relates to combination valve and electric switch assemblies and, more particularly, to a combination valve and electric switch assembly for completing a closed loop of an automatic vehicle leveling system and for selectively energizing an electrical component therein to vary the pressurization of a fluid spring included in the closed loop.

Automatic vehicle leveling systems for vehicles can include a fluid spring between the sprung and unsprung mass that is selectively pressurized to produce a load support supplement to the main spring for overcoming deflection therein that is produced by changes in the static loading on the sprung mass or vehicle chassis.

In order to prevent dirt, moisture or the like from entering the fluid spring, in certain systems, it is included in a closed loop which incorporates a high pressure source of air, such as an hermetically sealed tank or canister. A mechanically operated height controller located between the high pressure canister and the fluid spring is responsive to the changes in the height between the sprung and unsprung masses of a vehicle to selectively cause high pressure air to flow from the canister to the fluid spring during a fill phase of operation or to exhaust air from the fluid spring back to the canister during an exhaust phase of operation or, when the sprung and unsprung masses are at a desired predetermined height relationship, it will completely block the high pressure source from the fluid spring.

Such systems desirably include some means for pressure regulation and the high pressure source, the pressure flow controlling, mechanically operated, height controller and the fluid spring are often located at different points on the vehicle chassis and thereby require a number of fluid connections which must be carefully installed to prevent fluid leakage from the closed loop or into the closed loop.

An object of the present invention is to reduce fluid couplings in a closed loop, automatic vehicle leveling systems by the provision of a combination valve and electric switch assembly adapted to be connected to an hermetically sealed canister forming a high pressure source and including passageway means to communicate the exhaust or low pressure conduit of the closed system with the intake of a compressor within the high pressure source.

A further object is to provide such a combination assembly including means therein for sensing the pressure condition within the passageway means for operating electrical switch means to condition electrically energizable components in the system and thereby vary the pressure level between the high pressure canister and the fluid spring so as to maintain a vehicle in a predetermined desired height position.

Another object of the present invention is to provide a combination valve and electric switch assembly including an intake port and an outlet port. The intake port being in communication with a pressurizable cavity formed in part by a diaphargm movable in response to pressure changes in the cavity to produce movement of a pair of electrical contacts in the switch that are connected to means that prevent contact chatter; and wherein the switch includes return spring means for biasing the diaphragm into the cavity to move a valving element in the assembly into a closed position to block the cavity from a pressure source thereby preventing bleed-back of pressurized fluid through the assembly.

These and other objects of the present invention are attained in the preferred embodiment by an assembly that includes a housing having a switch enclosing bore therethrough along with first and second fluid passageways communicating with a cavity in which is located a movable pressure sensing diaphargm for operating the switch. The switch includes a return spring for biasing the diaphragm into an off position when low pressure exists in the cavity and it further includes a spring biased ball and detent unit for producing a snap movement of the contact of the switch upon diaphragm movement to prevent contact chatter.

The diaphragm in its low pressure position holds a teaser spring to position a check valve element closed to prevent flow from the intake conduit to the compressor back into the cavity.

When the diaphragm is moved from its low pressure position the check valve communicates the cavity and the inlet conduit to the compressor and the cavity thereby serves as a part of a fluid path between a low pressure source and the compressor. Concurrently with this control of the valve to the inlet conduit of the compressor, the electrical switch energizes an electrical component to produce a quick pump-down of air from the low pressure conduit.

Further objects and advantages of the present invention will be apparent from the following description, reference being had to the accompanying drawings wherein a preferred embodiment of the present invention is clearly shown.

Figure 2:
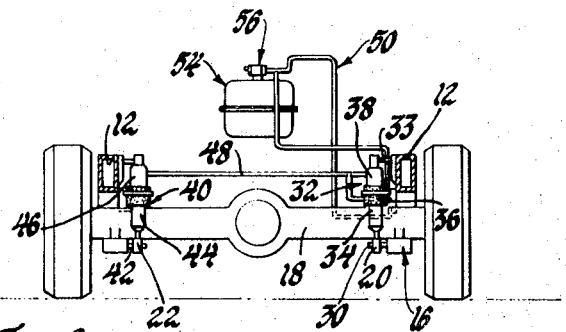
Figure 3:
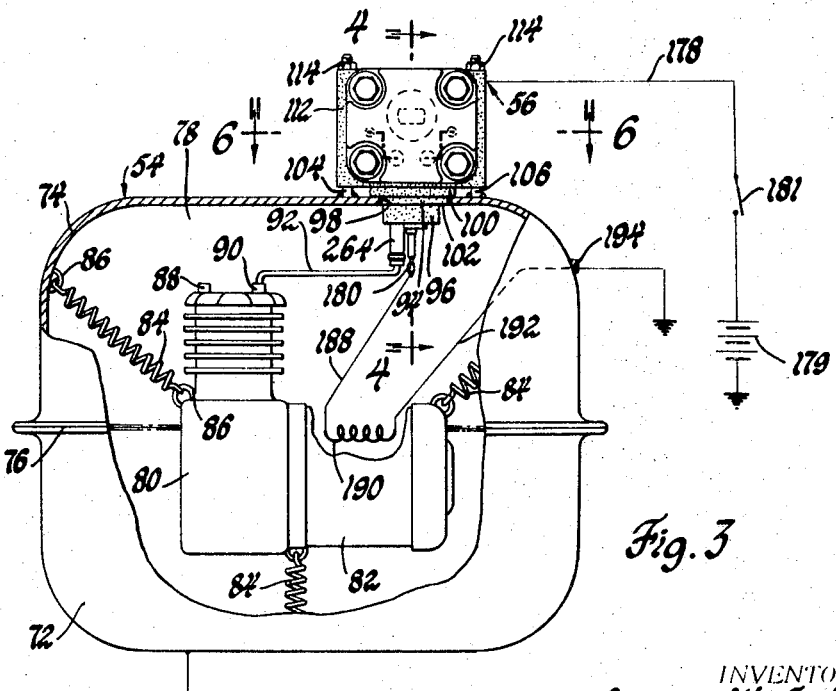
Figure 4:
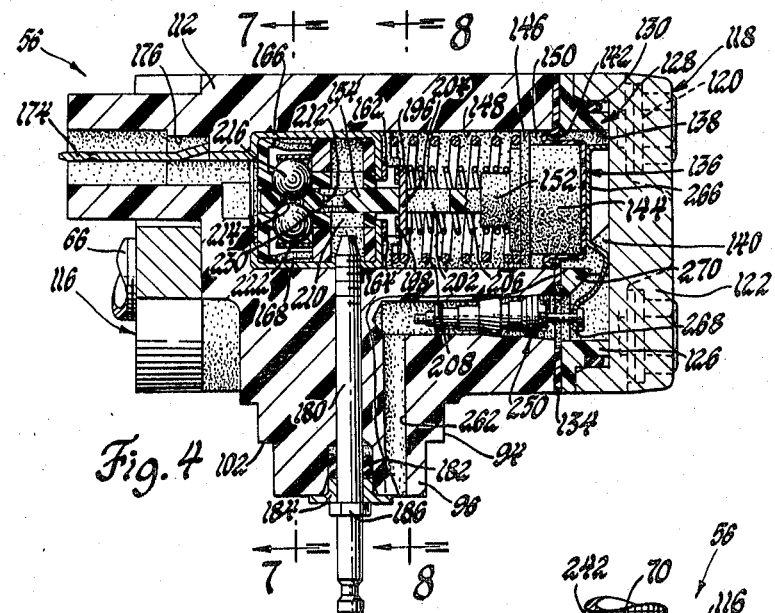
Figure 5:
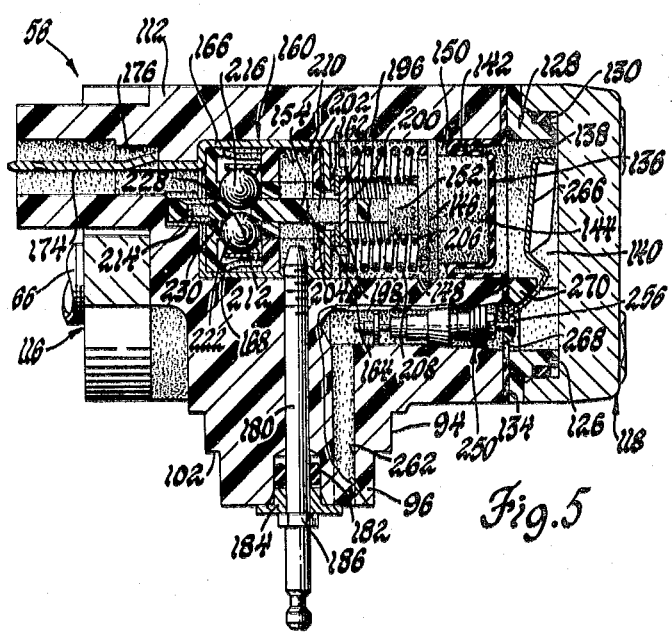
Figure 6:
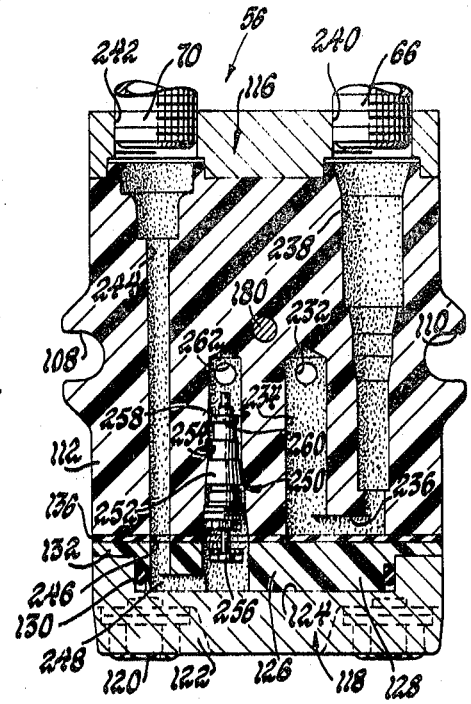
Figures 7, 8:
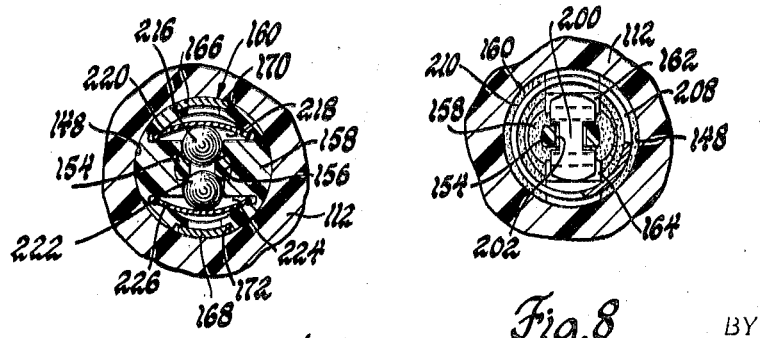

In the drawings:
FIG. 1 is a diagrammatic view showing the layout of a closed loop automatic vehicle leveling system including the present invention;
FIG. 2 is a vertical sectional view taken along the lines 2—2 of FIG. 1 looking in the direction of the arrows;
FIG. 3 is an enlarged view, partially broken away of a pressure source that has the combination valve and electrical control switch of the present invention connected thereto;
FIG. 4 is an enlarged view in vertical section taken along the line 4—4 of FIG. 3;
FIG. 5 is a view like FIG. 4 showing the electrical switching component of the invention in a closed position;
FIG. 6 is an enlarged view in horizontal section taken along the line 6—6 of FIG. 3 looking in the direction of the arrows;
FIG. 7 is a fragmentary vertical sectional view taken along the line 7—7 of FIG. 4; and
FIG. 8 is a fragmentary vertical sectional view taken along the line 8—8 of FIG. 4.

In FIG. 1 of the drawings a vehicle 10 is illustrated having a lower frame 12 with a front end supported by suspension components (not shown) to a pair of front wheel assemblies 14.

The vehicle is automatically leveled by moving the rear of the lower frame 12 with respect to a rear axle assembly 16. It includes an axle housing 18 which is fixedly secured to a pair of spaced apart control arms 20, 22. Each of the control arms has one end thereof directed toward the front of the car pivotally secured by a pin 24 to a bracket 26 depending from the lower frame 12. A primary coil suspension spring 28 is carried on each of the control arms 20, 22 between the connector pin 24 and the axle housing 18 to support the vehicle 10 at the lower frame member 12.

The end of the control arm 20 that is located rearwardly of the axle housing 18 is connected by a pin 30 to the lower mounting bracket of an auxiliary suspension unit 32 that has its upper mount connected by pin 33 to frame 12 to supplement the load carrying capacity of an adjacent one of the primary coil suspension springs 28.

In the illustrated arrangement the auxiliary suspension unit 32 includes a double direct acting hydraulic shock absorber 34 that carries a sleeve 36 to form a pressurizable air spring component 38 that is arranged generally concentrically of the double direct acting hydraulic shock absorber 34 to define a pressurizable control chamber into which pressurized air can be directed and exhausted to produce an uplifting force on the lower frame 12 at the right side of the axle housing 18 as seen in FIG. 2 for leveling the vehicle under conditions when the adjacent primary coil suspension spring 28 is deflected.

A second auxiliary suspension unit 40 has a lower mounting bracket thereon connected by a pin 42 to the rearwardly located end of the control arm 22. It includes a double direct acting hydraulic shock absorber 44 and a pressurizable air spring component 46 corresponding to like parts of the unit 32. The pressurizable control chamber of the air spring 46 is in direct communication with that of the air spring 38 through a cross-over tube 48.

The auxiliary suspension units 32, 40 are of a type more particularly set forth in U.S. Pat. No. 3,063,701 to Paul Long, issued Nov. 13, 1962. The details of the combination shock absorber and air spring unit form no part of the present invention and it should be clearly understood that other load supplementing components such as a bellows located adjacent the primary coil spring would be equally suited for use with the present invention.

The flow of pressurized fluid into and out of the auxiliary suspension units 32, 40 is controlled by a closed loop system 50 that includes a mechanically operated three position height control valve 52; an air pressure storage canister or tank 54 and a pressure sensitive valve and switch assembly 56 connected between the canister 54 and the mechanically operated three position height control valve 52 and operative in response to the operation of the valve 52 to determine whether or not pressurized air is exhausted or supplied to the pressurizable air springs 38, 46.

More particularly, in the illustrated arrangement the three position height control valve includes a housing 58 fixedly secured to the frame 12 and an oscillatable control shaft 60 extending therefrom for connection to one end of an operating lever 62 that is pivoted with respect to the housing 58 under the control of a link 64 connected between the distal end of the lever 62 and the control arm 20.

The system 50 further includes a supply conduit 66 having one end thereof connected to the assembly 56 and the opposite end thereof in fluid communication with an intake port in the valve housing 58. A supply and return conduit 68 connects an outlet port in the housing 58 to the pressurizable control chamber of the air spring 38. It serves as a two way conduit for flow of pressurized fluid to the auxiliary suspension units 32, 40 and for the exhaust of pressurized fluid therefrom whereby the pressure level in the control chambers of the air spring components 38, 46 can be varied to produce an upward load supporting action in addition to that of the primary suspension springs 28 necessary to maintain the lower frame 12 at a predetermined height relationship with respect to the axle housing 18. This results in a desired trim height position of the vehicle 10 with respect to ground.

The system 50 further includes an exhaust conduit 70 having one end thereof connected to an exhaust port in the housing 58 and the opposite end thereof connected to the pressurizable switch assembly 56 as is best seen in FIGS. 1 and 2.

In addition to the fluid flow controlling action of the valve 52 the system 50 further includes means for controlling communication between the interior of the tank 54 and the supply conduit 66 and exhaust conduit 70. Thus, referring more particularly to FIG. 3 it can be seen that the tank 54 is made up of a lower half 72 and an upper half 74 joined together at a belt line 76 by suitable means such as welding to hermetically seal a space 78 interiorly of the tank 54. Within the interior space 78 is located a reciprocating air compressor 80 that is driven by an electric motor 82. The compressor 80 and motor 82 are integrally joined and supported in space relationship with the inside wall of the tank 54 by means of a plurality of tension springs 84 each having one end thereof connected to an eyelet 86 on either the compressor 80 or motor 82 and the opposite end thereof connected to like eyelets on the inside surface of the tank 54.

The springs 84 serve to locate the compressor and motor within the space 78 and also serve to isolate the compressor and motor vibrations from the tank 54.

The compressor 80 includes an outlet or discharge port 88 in direct communication with the interior space 78. It further includes an inlet or suction port 90 that communicates with one end of a tube element 92 that has the opposite end thereof connected to the pressure switch assembly 56 in a manner to be described.

In accordance with certain principles of the present invention the pressure switch assembly 56 includes a stepped depending boss 94 thereon including a small diameter segment 96 that fits into the space 78 through an opening 98 in the upper tank half 74. The opening 98 is sealed by an annular O-ring element 100 that fits around the housing end of the boss 94 at a point between a shoulder 102 thereon and the upper surface of the housing half 74 as is best seen in FIG. 3.

Suitable fastener means bias the housing shoulder 102 against the O-ring 100 to maintain it in a fluid tight sealing relationship with the hole 98. In the illustrated arrangement they include a pair of upstanding stud elements 104, 106 seated in side slot elements 108, 110 formed in the main body 112 of the assembly 56 as is best seen in FIG. 6. A nut 114 is threadably connected to the upper end of each of the studs 104, 106 to produce the aforementioned seal of the O-ring 100.

The main body 112 of the assembly 56 includes a first end member 116 joined to an opposite end member 118 by a plurality of screws 120 located at each corner of the end plate 118 and extending from a head portion 122 thereof through openings running axially of the main body portion 112. Each of the screws 120 includes a threaded end thereon that holds the end member 116 tightly against the opposite end of the main body portion 112 as is seen in FIG. 6.

More particularly, the end member 118 is recessed at 124 to receive a stepped outer surface 126 of a ring-shaped spacer element 128. The stepped outer surface 126 defines an open end on the spacer element 128 that is closed by the end member 118 and sealed with respect thereto by an annular O-ring element 130 that is fitted sealingly between the surface 126 and the end member 118 at the recess 124 therein.

The spacer element 128 further includes a radially outwardly directed flange 132 on the opposite end thereof that is held by the end member 118 in sealing engagement with one side of an outer peripheral flange 134 of a diaphragm element 136 so as to close an opposite open end of the spacer element 128. A central bore 138 through the spacer element 128 defines a pressure sensing region 140 proximate to the diaphragm 136 for reasons to be discussed.

The diaphragm 136 includes a rolled segment 142 that fits over the end of a cylindrically shaped piston member 144 that has a radially outwardly directed flange 146 thereon slidably received in a bore 148 extending through part of the main body 112 along an axis in spaced parallelism with that of the bore 138 in spacer element 128. The flange 146 serves to define a space 150 into which the rolled segment 142 of the diaphragm 136 fits for free relative sliding movement with respect to the piston 144 as it is reciprocated within bore 148.

An extension 152 on the piston 144 is joined to an elongated stem 154 that is slidably received within a slideway 156 in a cylindrically shaped member 158 that fits in the bore 148 at the end thereof opposite to the end which is closed by the rolled segment 142 of the diaphragm 136.

The stem element 154 is guided by the member 158 during reciprocal movement of the piston 144 with respect to a switch latching assembly 160 that will produce a snap action switch opening and closing movement to prevent contact chatter.

A pair of spaced apart contacts 162, 164 are located on the end of the member 158 innermost within bore 148 in fixed relationship with respect to conductor elements 166, 168 that are received in diametrically located recesses 170, 172 in the outer circumferential surface of the member 158 as is best seen in FIG. 7. The conductor 166 in the upper recess 170 is integrally formed with a spade type electrical terminal 174 that is fixedly secured in a plug receiving recess 176 in an end portion of the main body 112 as best seen in FIG. 4.

The spade terminal 174 is adapted to be connected to an electrical conductor 178 to the positive terminal of a vehicle battery 179 through an ignition switch 181.

In the illustrated arrangement the lower conductor 168 is electrically connected to the upper end of an elongated pin terminal 180 that is directed laterally through the main body 112 into intersecting relationship with the bore 148. An annular O-ring 182 is seated in the main body portion 112 above a flanged plug element 184 that is seated on an annular shoulder 186 formed on the pin terminal 180 at the point where it extends from the main body portion 112 into the interior space 78 of the tank 54.

The pin terminal 180 is electrically connected to a lead 188 to one side of the motor winding 190 or a lead 192 from the opposite side of motor winding 190 that passes through a fluid sealing grommet 194 in the wall of the upper canister half 74. This in turn is electrically connected to ground.

The spaced apart conductors 162, 164 are fixedly located with respect to a pair of movable contacts 196, 198 carried on a conductor strip 200 that serves to bridge the contact pair 162, 164 when the switch is closed.

More particularly the strip 200 is directed through a rectangularly shaped slot 202 in the stem element 154. When the switch is open the strip 200 is held against an end surface 204 of the slot 202 by a coil spring 206 that has one end thereof fit around the piston extension 152 and the opposite end thereof maintained in spring biased engagement with the strip 200.

Concentrically of, and in surrounding relationship to the spring 206, is a larger diameter coil spring 208 that has one end thereof in engagement with the end of a spool member 210 that supports the member 158 and the opposite end thereof in engagement with the piston flange 146. The spring 208 resiliently urges the piston 144 inwardly of the pressure sensing chamber 140 thereby to maintain an open switch configuration between contact 162, 164 and the pair of contacts 196, 198 as is best seen in FIG. 4.

The slot 202 serves as a lost motion connection between the spring biased movable pair of contacts 196, 198 whereby movement of the contacts between an open and closed position can be accomplished without an exact spacing between the fixed and movable contacts. Furthermore it cooperates with the switch latching assembly 160 to produce an improved snap opening and closing movement of the contact pairs 162, 164 and 196, 198.

More particularly to accomplish this aim the stem element 154 includes a pair of spaced apart openings 212, 214 therethrough each of which includes an inwardly tapered large diameter opening that serves as a seat for ball elements of the latching assembly 160.

More particularly a first ball element 216 is located in the member 158 at an opening 218 and is spring biased by a bow spring element 220 as is best seen in FIG. 7 against the upper surface of the stem element 154.

A second ball element 222 in an opening 224 in the stem element 158 is spring biased by a bow spring element 226 against the other side of the stem element 154. The first and second ball elements 216, 222 produce a pinching movement and coact with the openings 212, 214 to hold the stem 154 at the open and closed position shown in FIG. 4 and FIG. 5 respectively.

By virtue of the afore-described arrangement as the stem element 154 is shifted within the bore 148 in a contact closing direction (to the left as seen in FIG. 4) the spaced apart biased balls 216, 222 are forced from the opening 214 against the biasing action of the bow springs 220, 226. The ball 216 more particularly rides upwardly of the opening 114 and across a knife edge segment 228 on the upper surface of the stem 154 and concurrently the ball 222 moves upwardly of opening 214 across a knife edge segment 230 on the other side of the stem 154 and thereafter rapidly descends into the detent opening 212 to produce a snap movement of the stem 154 into the closed position of FIG. 5. The surface 204 on the stem 154 thereby is rapidly shifted away from the bridging conductor strip 200 whereby it is instantaneously moved by the spring 206 so that the movable contacts 196, 198 will snap against the fixed contacts 162, 164.

Opening movement proceeds in a like fashion with the spaced apart ball elements 216, 222 being forced from the opening 212 and shifted across the knife edge segments 228, 230 and thereafter forced into the opening 214 to produce a rapid shifting movement of the stem 154 in an opposite direction. This action causes the surface 204 on the rapidly moving stem 154 to pick up the bridging conductor 200 and move it against the force of spring 206.

The valve and switch assembly 56 further defines a fluid flow path communicating the interior 78 of the tank 54 with the supply conduit 66. More particularly this path, which is best seen in FIGURE 6, includes a passageway 232 through the body 112 having one end thereof opening through the boss 94 with the interior 78 and the opposite end thereof generally perpendicular to an intersecting relationship with a passageway 234 that opens into the end of the housing 112 where it is in contact with the diaphragm 136. A part of the diaphragm 136 cooperates with the body 112 to form a cross-over passageway 236 that communicates with a multidiameter bore 238 in the body 112 that runs parallel to the passageway 134 to a point where it communicates with an outlet port 240 in end member 116. The port 240 is fluidly connected to the inlet end of the supply conduit 66 whereby any pressurized fluid in the tank is in direct communication with the three position height control valve 52 via the conduit 66.

Further, the pressure switch assembly 56 serves as a segment of a fluid path communicating the exhaust conduit 70 with the inlet 90 to the compressor 80.

More particularly this path includes a port 242 in the end member 116 that is connected to the exhaust conduit 70. A passageway 244 extending from one end of the body 112 to the opposite end thereof as is best seen in FIG. 6 fluidly connects the port 242 with an opening 246 through the diaphragm 136. A cross-over passageway 248 in the spacer element 128 joins the opening 246 with the pressure sensing chamber 140. From the chamber 140 the inlet path flows across a Schrader type valve 250 having a core 252 seated in an end bore 254 of the body 112.

The Schrader valve 250 further includes an operating stem 256 located within the chamber 140 having a valving element 258 on the opposite end thereof. The valving element 258 is shown closed in FIG. 4 against a valve seat 260 on the end of core 252. In FIG. 5 the element 258 is shown in its open position.

The bore 254 communicates with a passageway 262 that is generally parallel to the outlet passageway 232 from the interior space 78 of tank 54. The passageway 262 is joined by a downwardly depending tubular member 264 to the inlet conduit 92 thence to the inlet port 90.

By virtue of the above-described arrangement the system is operable in response to load changes on the vehicle 10 to correct for both upward and downward movement of the vehicle frame 12 from a desired trim height relationship, for example, a height relationship wherein the vehicle frame 12 is generally parallel to a supporting ground surface.

Further, by virtue of the above-described arrangement only a single seal element represented by the O-ring 100 is required to fluidly seal a plurality of conduits to and from the tank 54. Moreover, the assembly 56 enables substantially instantaneous exhaust and fill of the system wherein the vehicle 10 can be quickly leveled.

A working version of the invention was used and performed satisfactorily in an automatic leveling system having a storage tank charged at an operating pressure from 115 p.s.i. to 200 p.s.i. In response to an addition of load on the chassis of the vehicle that causes the inlet valve assembly of the unit to open, the fluid spring component is pumped up within fifteen seconds.

Following removal of the load causing the vehicle to move into an exhaust phase of operation the exhaust valve opens to cause the system to pump down within a 1 to 1.5 minutes period.

More particularly, the system 50 is operated under three general phases of operation.

NEUTRAL OPERATION

When the vehicle is at a curb location and unloaded the primary suspension springs 28 at the rear axle assembly and like components at the front of the vehicle will maintain the frame 12 generally parallel to ground support. At this point the three position height control valve 52 has the actuator arm 62 generally in the position shown in FIG. 1 and a valving element therein will block fluid communication between both the conduits 66, 70 and the supply and return conduit 68.

OVERLOAD OPERATION

When the vehicle is loaded a predetermined deflection of the primary suspension spring 28 occurs that will cause movement of the rear part of the frame 12 downwardly with respect to the axle housing 18.

When this occurs the operating arm 62 is pushed upwardly by the link 64 and will cause the valve 52 to be conditioned to open communication between the valve inlet port that is connected to the supply conduit 66 and a valve outlet port that is connected to the supply and return conduit 68. Concurrently an exhaust port connected to the conduit 70 is blocked.

The interior 78 of the tank 54 is in direct communication with the control chamber of the auxiliary suspension units 32, 40 via the fluid path defined by passageways 232, 236, bore 238 and port 240 through the body 112; the conduit 66; the valve 52; the conduit 68; thence through the cross-over passageway or tube 48 whereby both of the pressurizable air springs 38, 46 are inflated to produce an upward resultant force on the lower frame 12 between it and the control arms 20, 22. This uplifting force supplements that of the primary suspension springs to the additional load on the vehicle. The return of the vehicle to its trim height relationship will cause the valve 52 to assume its neutral position wherein the pressurized air spring components 38, 46 are blocked from the remainder of the closed system.

PUMP DOWN

Under conditions when the vehicle is unloaded and the air springs are pressurized the combination uplifting action on the bottom frame member 12 can cause it to move upwardly of the axle housing 18 to a point above a desired standing height.

Under this condition the link 64 pulls the operating arm 62 downwardly to condition the valve 52 to block communication between the inlet and outlet ports thereof and to open communication between the outlet port and the exhaust port in the housing 58 whereby the conduit 68 will be maintained in direct fluid communication with the exhaust conduit 70.

The high pressure air in the control chambers of the pressurizable air springs 38, 46 will be directed through the conduit 70 and the port 242 into the housing passageways 244, the diaphragm opening 246 thence through the cross-over passageway 248 into the sensing chamber 140. The high pressure in the pressure sensing chamber 140 will act on the diaphragm 136 causing the aforedescribed contact closing movement to occur.

A teaser spring 266 that is located in the chamber 140 has an end portion 268 thereon that engages the operating stem 256 of the Schrader valve 250. When the diaphragm 136 shifts the switch controlling piston 144 to close the switch the teaser spring 266 will move against an abutment 270 in the spacer member 128 to allow the stem 256 to be moved by an internal spring (not shown) of the valve 250 in a direction to cause the valving element 258 to move from the seat 260, as is seen in FIG. 5.

Accordingly the pressure sensing chamber 140 serves the function of producing a switch closing force on the diaphragm 136 and the additional function of allowing fluid flow across the Schrader valve 250 thence through the passageway 262 to the intake port 90 of the compressor 80. Since the contacts are closed and assuming that the ignition switch 181 is also closed, a motor energization circuit from the positive terminal of the batter 179 is completed through the switch 181, the conductor 178, thence through the spade terminal 174 to the fixed contact 162, thence through the movable contacts 196, 198 and the bridging conductor 200 and the contact 164 to the pin terminal 180 thence through the conductor 188 to one side of the motor winding 190. The opposite side of the winding 190 is connected by the conductor 192 to ground.

An important aspect of the invention is that the assembly 56 simultaneously serves as a fluid flow path for pressurizing the intake of the compressor and as a means for energizing the compressor whereby once the mechanically operated three position valve 52 directly communicates the conduit 68 with the conduit 70 the system will be operated to quickly pump compressed air from the pressurizable air springs 38, 46 and discharge it through the outlet port 88 into the interior 78 of the tank 54. Concurrently the three position valve 52 blocks communication between conduit 68 and conduit 66 which is connected through the assembly 56 to the interior 78 of the tank 54. Accordingly air being discharged from the outlet port 88 is retained in the interior 78 for subsequent use in the system.

The mechanically operated three position valve 52 is damped against ordinary road movements and is only responsive to changes in the static loading on the vehicle. As a result it serves to block fluid flow from the precharged chamber 78 whereby flow will only occur from the tank 54 into the control chambers of the pressurizable air springs 38, 46 if and when the static load on the vehicle is changed so as to cause a sustained change in the deflection of the primary suspension springs 28.

By virtue of the aforedescribed arrangement wherein a single control assembly 56 includes a portion of a supply path from a precharged pressurized reservoir to a mechanically operated control valve and a portion of an exhaust path from the same valve to the intake of a compressor for producing precharging of the interior of the canister, only a single sealing element is required between the interior of the tank and the remainder of the system. Furthermore, compressor operation occurs immediately when the mechanically operated valve is shifted by a change in the static loading.

A further advantage is that the system does not require a pressure regulator valve between the pressure source represented by the interior 78 of the tank 54 and the control chambers of the pressurizable air springs 38, 46.

Furthermore the system is fail safe from a leak standpoint. Thus, under conditions where the vehicle is in its curb height position and assuming that the supercharged air escapes from the interior 78 the only problem is that when the three position height control valve 52 moves to a position communicating the interior 78 with the air spring units there will be no flow of pressurized fluid immediately into the air springs. Thus the system will rely on the normal spring or load carrying capacity of the primary suspension springs. When the vehicle is unloaded these springs will return the chassis to a desired trim height relationship and a condition that would have otherwise caused a pump down will not occur since there is no supplemental load carrying action by the air springs. Accordingly, there is no condition that will cause operation of the electric motor to drive the compressor under such leakage conditions.

While the embodiments of the present invention as herein disclosed constitute a preferred form, it is to be understood what other forms might be adopted.

What is claimed is:

1. In an automatic vehicle leveling system for correcting standing height changes of the vehicle as produced by load changes on the vehicle chassis supported on an axle assembly by a primary suspension spring comprising: auxiliary fluid spring means adapted to be connected between the chassis and the axle assembly to correct for load changes on the chassis, a high pressure storage tank means for fluidly connecting said high pressure tank to said fluid spring means including a supply conduit and a height controller for sensing changes in the height relationship between the chassis and the axle assembly, means for returning air from said fluid spring means to said high pressure tank including a return conduit and said height controller, an electric motor driven compressor located interiorly of said tank, said compressor having an outlet directly communicated with said tank interior, an inlet to said compressor, pressure switch means for connecting said electric motor driven compressor to a power source, said pressure switch means including a pressure responsive component sensing the pressure level in said return conduit, said pressure switch means including a fixed contact and a movable contact having open and closed positions, spring means acting against said pressure responsive component to move said contacts into one of said open and closed positions, a valve component connected between said return conduit and said compressor intake normally closed to block flow from said tank interior, means responsive to said pressure component when in its contact open position to close said valve component to prevent fluid leakage from said tank through said compressor to produce a pressure increase in said return conduit capable of closing said fixed and movable conduits when said height controller blocks communication between said fluid spring and said exhaust conduit.

2. In an automatic vehicle leveling system for correcting standing height changes of the vehicle as produced by load changes on the vehicle chassis supported on an axle assembly by a primary suspension spring comprising: auxiliary fluid spring means adapted to be connected between the chassis and the axle assembly to correct for load changes on the chassis, a high pressure storage tank means for fluidly connecting said high pressure tank to said fluid spring means including a supply conduit and a height controller for sensing changes in the height relationship between the chassis and the axle assembly, means for returning air from said fluid spring means to said high pressure tank including a return conduit and said height controller, and electric motor driven compressor located interiorly of said tank, said compressor having an outlet directly communicated with said tank interior, an inlet to said compressor, pressure switch means for connecting said electric motor driven compressor to a power source, said pressure switch means including a housing having a central bore, means to define a pressurizable control chamber, a flow passageway in said housing having one end thereof in communication with said control chamber and the other end thereof adapted to be connected to the intake of said compressor, valve means within said passageway, a valve operator extending into said control chamber and movable between valve open and closed positions, a spring component located within said control chamber having a segment thereon engageable with said valve operator and a second segment thereon engageable with said diaphragm, an elongated stem connected to said diaphragm extending through said central bore having a movable electrical contact supported thereon, a fixed electrical contact, said stem being moved by said diaphragm to open and close said fixed and movable contacts for controlling energization, said compressor spring biased indexing means within said bore, coacting means on said indexing means and said stem for producing snap opening and closing movement of said movable contact with respect to said fixed contact, said diaphragm and said valve controlling spring component coacting when said fixed and movable contacts are open to close said valve means to prevent fluid leakage from said tank through said compressor to produce a pressure increase in said return conduit capable of closing said fixed and movable contacts when said height controller blocks communication between said fluid spring and said exhaust conduit.

3. In an automatic vehicle leveling system for correcting standing height changes of the vehicle as produced by load changes on the vehicle chassis supported on an axle assembly by a primary suspension spring comprising: auxiliary fluid spring means adapted to be connected between the chassis and the axle assembly to correct for load changes on the chassis, a high pressure storage tank means for fluidly connecting said high pressure tank to said fluid spring means including a supply conduit and a height controller for sensing changes in the height relationship between the chassis and the axle assembly, means for returning air from said fluid spring means to said high pressure tank including a return conduit and said height controller, an electric motor driven compressor located interiorly of said tank, said compressor having an outlet directly communicated with said tank interior, an inlet to said compressor, pressure switch means for connecting said electric motor driven compressor to a power source, said pressure switch means including a pressure responsive component sensing the pressure level in said return conduit, said pressure switch means including a fixed contact and a movable contact having open and closed positions, spring means acting against said pressure responsive component to move said contacts into one of said open and closed positions, a stem connecting said pressure responsive component with said movable contact, said stem having a plurality of spaced apart openings along the length thereof, an over travel slot in said stem, means for biasingly supporting said movable contact for over travel movement in said slot following engagement of said movable contact with said fixed contact, a pair of spaced apart indexing components on either side of said stem adapted to releasably engage said stem at said openings therein, spring means for biasing said spaced apart indexing components into each of said spaced apart openings upon travel of said stem with respect to said indexing components thereby to produce a snap action movement between said movable contact and said fixed contact in response to pressure changes on said pressure responsive component, a valve component connected between said return conduit and said compressor intake, means responsive to said pressure component when in its contact open position to close said valve component to prevent fluid leakage from said compressor intake interiorly of said exhaust conduit to prevent closure of said fixed and movable contacts when said height control valve means blocks communication between said exhaust conduit and said fluid spring means.

4. A combination valve and electric switch assembly for controlling energization of an electrical component in an automatic closed loop vehicle leveling system for maintaining a standing height position between a vehicle chassis and its axle assembly comprising, a housing including a central bore, means including a flexible diaphragm closing one end of said bore to define a pressurizable control chamber, a flow passageway in said housing having one end thereof in communication with said control chamber and the other end thereof adapted to be connected to the intake of a compressor, valve means within said passageway, a valve operator extending into said control chamber and movable between valve open and closed positions, a spring component located within said control chamber having a segment thereon engageable with said valve operator and a second segment thereon engageable with said diaphragm, an elongated stem connected to said diaphragm extending through said central bore having a movable electrical contact supported thereon, a fixed electrical contact, said stem being moved by said diaphragm to open and close said fixed and movable contacts for controlling energization of the electrical component, spring biased indexing means within said bore, coacting means on said indexing means and said stem for producing snap opening and closing movement of said movable contact with respect to said fixed contact, said diaphragm and said valve controlling spring component coactinng when said fixed and movable contacts are open to close said valve means flow through said passageway to block during periods when the electrical component is deenergized.

5. A combination valve and electric switch assembly for controlling energization of an electrical component in an automatic closed loop vehicle leveling system for maintaining a standing height position between a vehicle chassis and its axle assembly comprising, a housing including a central bore, means including a flexible diaphragm closing one end of said bore to form a pressurizable control chamber, a flow passageway in said housing having one end thereof in communication with said control chamber and the other end thereof adapted to be connected to the intake of a compressor, valve means within said passageway, a valve operator extending into said control chamber and movable between valve open and closed positions, a spring component located within said control chamber having a segment thereon engageable with said valve operator and a second segment thereon engageable with said diaphragm, an elongated stem connected to said diaphragm extending through said central bore having a movable electrical contact supported thereon, a fixed electrical component, said stem having a plurality of spaced apart openings along the length thereof, an over travel slot in said stem, means for biasingly supporting said movable contact for over travel movement in said slot following engagement of said movable contact with said fixed contact, a pair of spaced apart indexing components on either side of said stem adapted to releasably engage said stem at said openings therein, spring means for biasing said spaced apart indexing components into each of said spaced apart openings upon travel of said stem with respect to said indexing components thereby to produce a snap action movement between said movable contact and said fixed contact in response to pressure changes in said control chamber, said diaphragm and said valve controlling spring component coacting when said fixed and movable contacts are open to close said valve means to block flow through said passageway when the electrical component is deenergized.

References Cited
UNITED STATES PATENTS

| | | | |
|---|---|---|---|
| 3,071,394 | 1/1963 | Miller | 280—124(F) |
| 3,082,018 | 3/1963 | Smirl | 280—124(F) |
| 3,120,962 | 2/1964 | Long | 280—6(H) |

PHILIP GOODMAN, Primary Examiner